Patented Sept. 16, 1924.

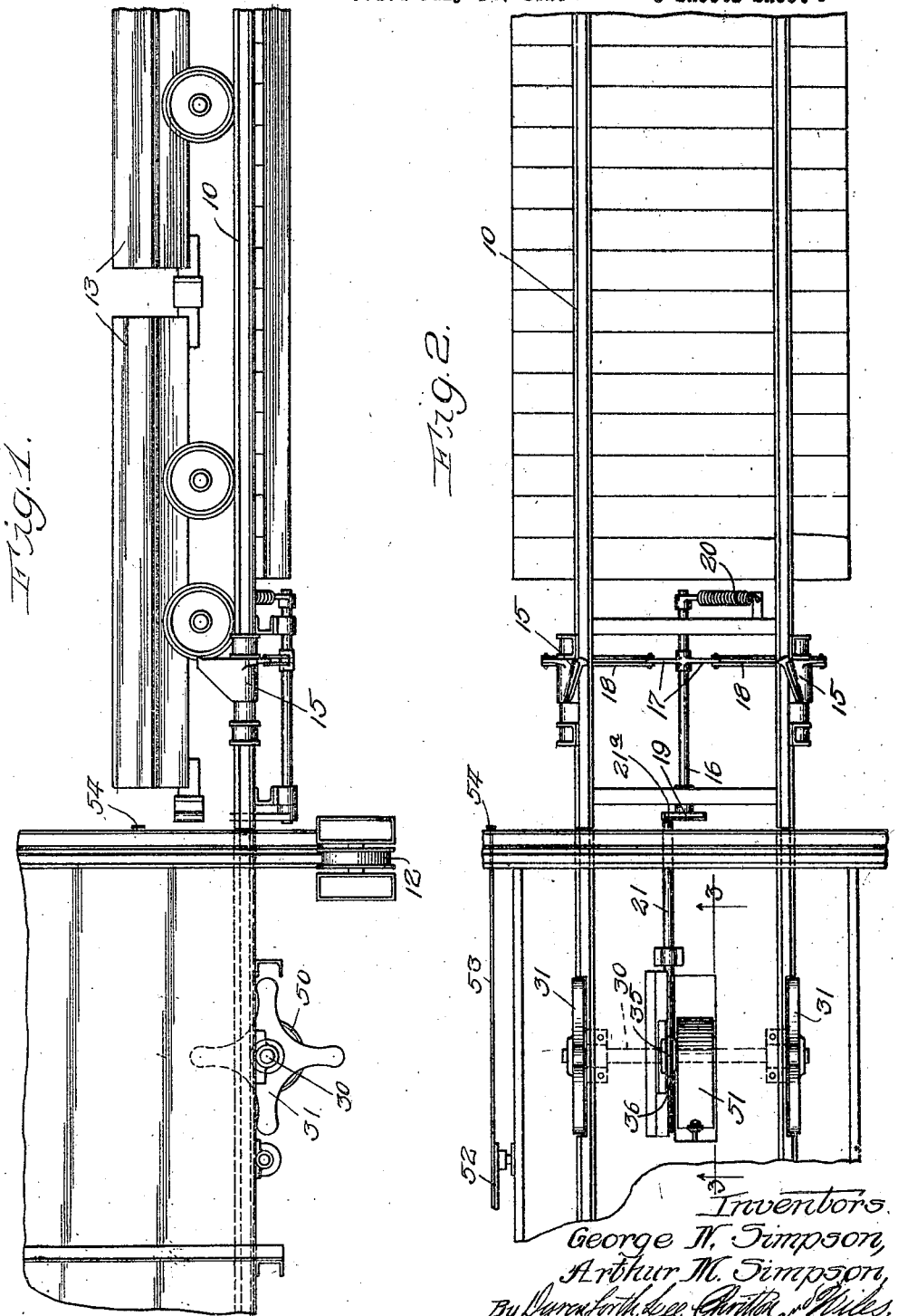

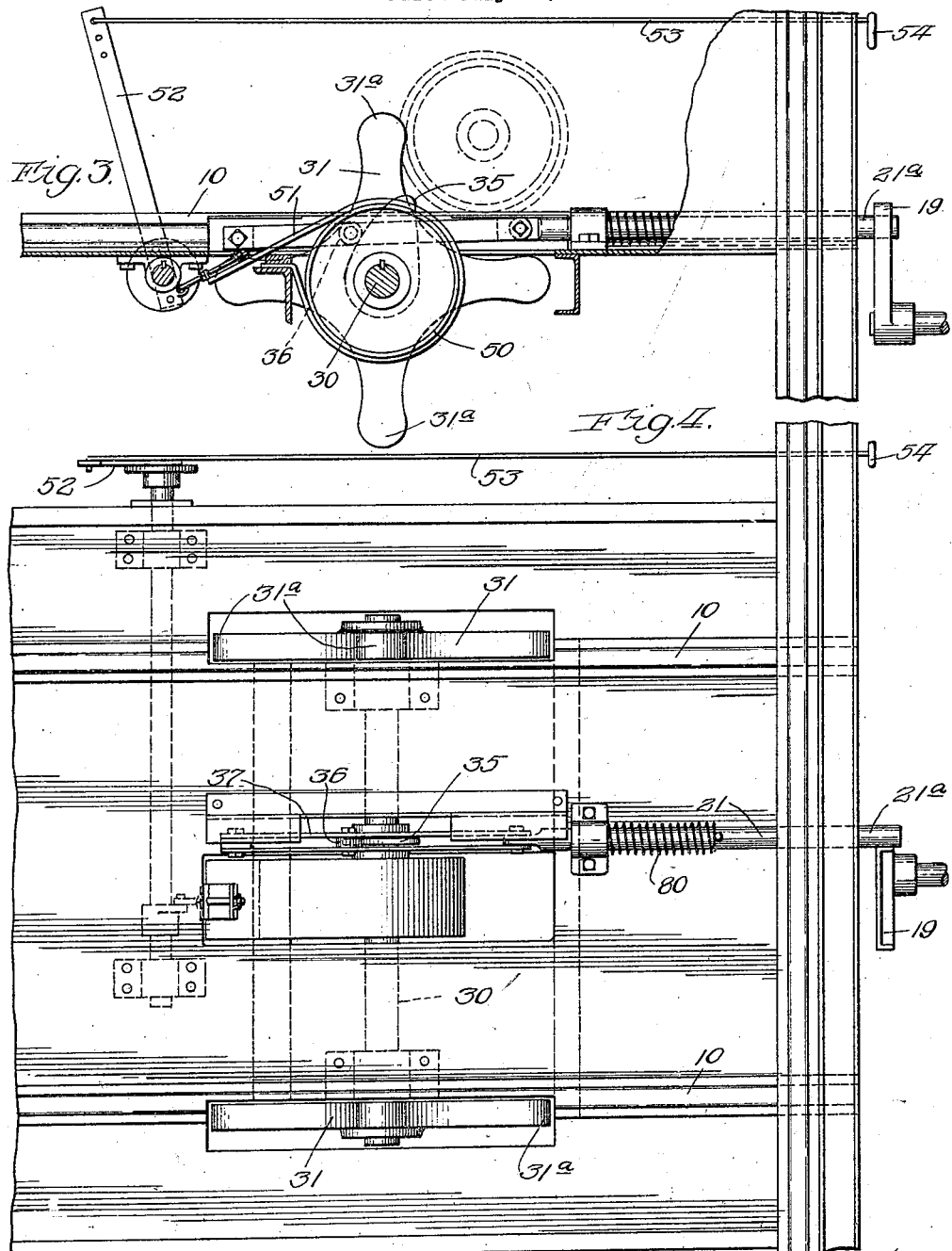

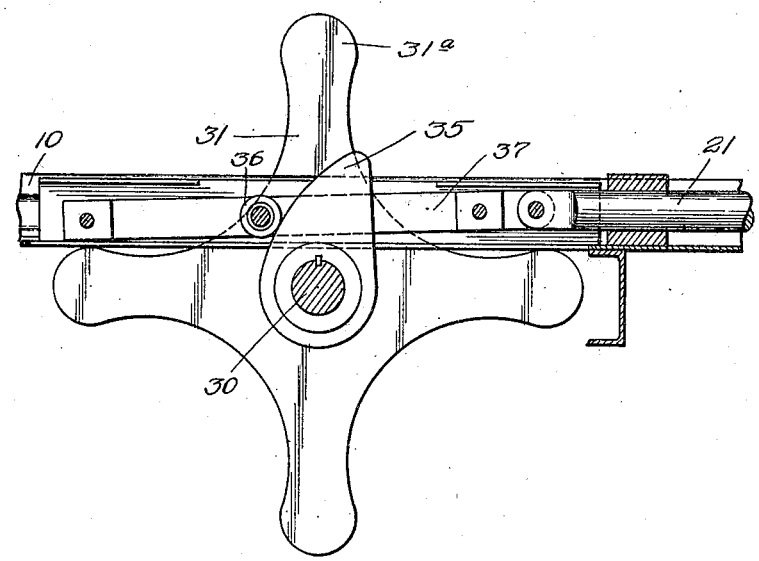
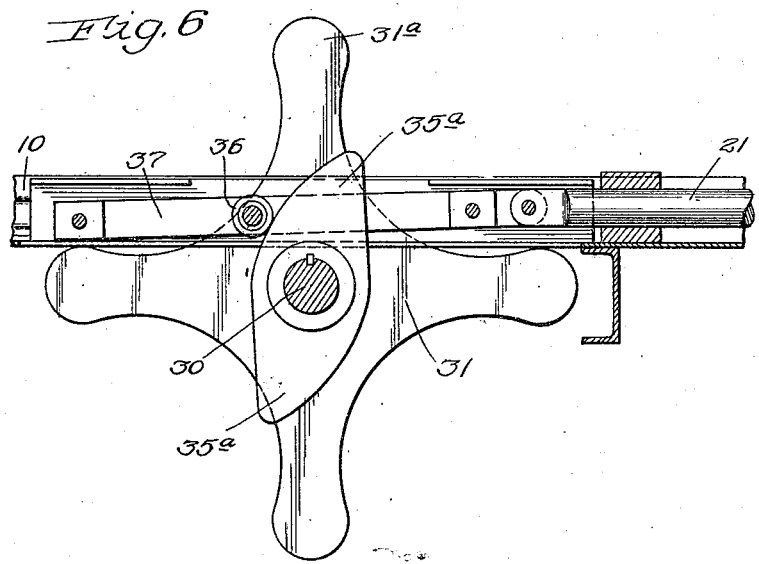

1,508,999

UNITED STATES PATENT OFFICE.

GEORGE N. SIMPSON AND ARTHUR M. SIMPSON, OF CHICAGO, ILLINOIS.

CAR CONTROL.

Application filed July 14, 1923. Serial No. 651,512.

*To all whom it may concern:*

Be it known that we, GEORGE N. SIMPSON and ARTHUR M. SIMPSON, citizens of the United States, residing at Chicago, in the county of Cook and State of Illinois, have invented a new and useful Improvement in Car Control, of which the following is a specification.

This invention relates to improvements in car control apparatus and is here shown embodied in an apparatus adapted for use in connection with a rotary car dump to control the approach and entry of the cars upon the dump. By means of the invention, the movement of a trip or string of cars may be so regulated and controlled that a predetermined number of cars, for example, one or two, may be fed onto any structure, for example, a rotary dumping cage. By the use of the invention it is also possible to regulate the speed of the cars approaching or entering, or stop them entirely, if desired. Other features and advantages of the invention will appear more fully as we proceed with our specification.

In that form of device combining the features of our invention shown in the accompanying drawings,—

Figure 1 is a view inside elevation showing the control apparatus as used in connection with rotary dumping cage;

Figure 2 is a similar view in plan,

Figure 3 is a sectional view on an enlarged scale of the apparatus on the rotary dump, Figure 4 is a similar view in plan, Figure 5 is a view on an enlarged scale of the star wheel forming a part of the apparatus, and Figure 6 is a view on an enlarged scale of a modified form of a star wheel showing the same adapted for feeding one car at a time.

As shown in the drawings, 10 indicates the approach track leading to the rotary dumping cage 11 which may be of any well-known form. For example, the cage, as here shown, is cylindrical and supported on rollers 12. The cage is adapted to hold two cars at once and dump the same by rotation in a well-known manner. 13, 13 indicate a string or trip of cars on the track leading to the rotary dump. There may be any number of these cars in a trip on the track approaching the dump, and they may be moved toward the dump by gravity, or any other suitable pushing or pulling means.

Since the rotary dump will hold but two cars, it is necessary to provide some means for feeding two cars at once into the dump at the same time, holding back the remaining cars on the approach track. After the two cars in the dump have been emptied, they must be allowed to leave the dumping cage, as two more loaded cars enter. In other words, the string or trip of cars is virtually fed through the dumping cage; the movement of the cars into the cage being stopped, however, to permit dumping of each two cars in the cage. The force moving the cars toward and into the cage may be considerable; and it may be desirable, therefore, to provide means for retarding the progress of the cars. Means for accomplishing these results are embodied in our invention.

In general, it may be stated, that we provide a set of positive car control horns on the approach track in front of, or above the rotary car dumping cage, and in the cage we provide a star wheel release mechanism. As the trip of cars moves ahead two car lengths, the four wheels on the two cars which pass over the star wheels will release a plunger shaft, allowing the horns on the approach track to close in front of the next car. In connection with the star wheel release mechanism, there is also provided a brake mechanism so that it is possible to positively control the speed of the cars as they move through the cage.

The control horns on the approach track are indicated by 15, 15, each being mounted on a rotatable shaft so that they may be moved from operative position in the path of the car wheels to inoperative position out of the path of the wheels. The movement of these horns is controlled by a longitudinal shaft 16 which is provided with short arms 17 connected to the horns 15 by the links 18. The end of the shaft 16 is provided with a fan-shaped lever 19. Rotation of the shaft 16 operates through the links 18 to move the horns 15. A spring 20 operates to yieldingly hold the horns in operative position.

The following means are provided for automatically opening the horns 15 at the completion of each rotation of the rotatable dumping cage. Such means include the longitudinal shaft 21 on the cage. The end of the shaft, 21a normally projects slightly beyond the end of the rotatable cage so that it will engage the fan-shaped lever 19 as the cage comes to its normal upright position after a dumping operation. This engagement of the end of the shaft 21a with the fan-shaped lever 19, rotates the shaft 16 and consequently opens the horns 15 allowing the cars to pass. After a certain number of cars have passed, the shaft 21 is moved longitudinally a short distance until the end 21a is free from the fan-shaped lever 19, whereupon the spring 20 operates to reset the horns.

The endwise movement of the shaft 21 is accomplished in the following manner. Transversely mounted in the dumping cage is a rotatable shaft 30 having at each end a star wheel 31. The star wheel 31 is provided with four points, radial arms, or projections 31a. The star wheels 31 are arranged in recesses in the rails 10 on the cage, so that the arms will be engaged by the wheels of passing cars. The shaft 30 is mounted below the level of the rails 10 so that the arms 31 will project above the level of the rails. By this construction, it is possible for the wheels of a car, to pass by the star wheels if the shaft 30 is permitted to rotate. A pair of wheels in passing the star wheels will obviously lower one of the arms 31a (on each star wheel) and raise the next one, thus turning the shaft 30 substantially 90°. Near its center, the shaft 30 is provided with a dog 35 adapted to engage a roller 36 arranged between the two links 37 which are attached to the end of the shaft 21. It will be seen that by this construction one complete rotation of the shaft 30 will draw the shaft 21 back and then release it. A spring 80 operates to yieldingly hold the shaft 21 in the position shown in Fig. 4, where its end 21a will engage the fan-shaped lever 19. By this construction, four wheels passing over one of the star wheels 31 will cause one complete rotation of the shaft 30 and a consequent movement of the longitudinal shaft 21, and release of the fan-shaped lever 19 causing the horns 15 to be set. Each mine car has two wheels on one side. It will be seen, therefore, that with this construction, after two cars have entered the dumping cage the horns 15 will be released and reset by the spring 20 thus preventing more cars from entering the cage. After the two cars in the cage have been dumped by rotation of the cage, the end of the shaft 21a engages the fan-shaped lever 19 thus opening the horns 15 and allowing the loaded cars to enter the cage. Such loaded cars entering the cage force out the two empty cars in the cage, rotate the shaft 30 one complete rotation as described above and thus again reset the horns 15 to prevent more cars from entering. This operation is repeated, as the cars, two by two, enter the cage and are dumped.

The star wheels are preferably set so that the front wheels of the second car entering the dump will cause the setting of the horns 15. When the two loaded cars are in position in the dump, the back wheels of the second car will be behind the star wheels. The star wheels, as will be explained more in detail hereafter, may be used to retard the cars leaving the dump and also may be used to hold the cars in the dump for dumping. It is obvious, also, that the star wheels may be set in other positions. For example, the parts could be so arranged that the back wheels of the second car would cause the setting of the horns 15. If the apparatus were so arranged, however, the distance between the star wheels and the horns 15 would have to be shortened by moving the star wheels back on the dump so that the horns 15 would be set before the car to be caught had passed beyond them. It is obvious, also, that the setting of the parts depends to some extent upon the distance of the wheels of the cars and the length of the over-hang of the cars. As the parts are shown in the drawings, the over-hang of the cars is of sufficient length so that if the front wheels of the second car entering the dump set the stops 15, the front wheels of the third car will still be behind the horns 15 and be engaged by them, thus preventing the third car from entering the dump. In Fig. 3, the wheels shown in dotted lines represent the substantial position of the front wheel of the second car entering the dump.

The cars fed to the cage may be pulled or pushed in any suitable manner and the following means are provided for regulating the speed of the cars approaching or entering the dump, or stopping them entirely, if desired. The shaft 30 is provided with a brake drum 50 engaged by a brake band 51 controlled by the lever 52 which in turn is operated by the rod 53 to the end of which is attached the operating handle 54. By means of this brake band the rotation of the shaft 30 may be stopped or controlled, as desired. It is evident that by control of the shaft 30 the rotation of the star wheels may be slowed down or stopped, thus stopping or regulating, as desired, the movement of cars over the same.

With the apparatus arranged as shown in Figs. 1 to 5 inclusive, adapted for feeding two cars at a time into the dump, the star wheel is set so that the front wheels of the second car will cause engagement between the dog 35 and the roller 36 to set the stops 15. When the two cars to be dumped are in position in the dumping cage, the back wheels of the second car will be behind the star wheel. The star wheel may thus be used as a stop in the dump structure to hold the two cars therein.

In Fig. 6, we have shown a slight modification, showing how the apparatus is adapted to permit the entry of but one car into the car dumping cage instead of two. It will be noticed that the shaft 30 instead of being provided with but one dog 35 as in the preferred form is here provided with two diametrically arranged dogs 35ª. With this structure, it is obvious, that rotation of the shaft 30 though but 180° will cause movement of the shaft 21 and consequent release of the horns 15, permitting them to be set by the spring 20. By this construction, after one car passes the star wheel 31, the horns 15 will again be reset preventing the entry of more cars onto the cage.

While we have shown and described certain embodiments of our invention, it is to be understood that it is capable of many modifications. Changes therefore in the construction and arrangement may be made without departing from the spirit and scope of the invention as disclosed in the appended claims, in which it is our intention to claim all novelty inherent in our invention as broadly as possible in view of the prior art.

We claim:

1. In a device of the character described, a car containing structure, an approach track leading to the car containing structure, a movable stop on the approach track, and means on the car containing structure for setting the stop, said means adapted to be operated by successive engagement of a predetermined number of parts on passing cars.

2. In a device of the character described, a car containing structure, an approach track leading to the car containing structure, a movable stop on the approach track, and means on the car containing structure for setting the stop, said means including a rotatable member adapted to be operated by successive engagement of a predetermined number of parts on passing cars.

3. In a device of the character described, a car containing structure, an approach track leading to the car containing structure, a movable stop on the approach track, and means on the car containing structure for setting the stop, said means including a rotatable member having arms adapted to be engaged by parts on passing cars to cause rotation of the rotatable member.

4. In a device of the character described, a car containing structure, an approach track leading to the car containing structure, a movable stop on the approach track, means on the car containing structure for setting the stop, said means adapted to be operated by successive engagement of a predetermined number of parts on passing cars, and means for retarding the movement of said stop setting means.

5. In a device of the character described, a car containing structure, an approach track leading to the car containing structure, a movable stop on the approach track, means on the car containing structure for setting the stop, said means including a rotatable member adapted to be operated by successive engagement of a predetermined number of parts on passing cars, and means for retarding the rotation of said rotatable member.

6. In a device of the character described, a car containing structure, an approach track leading to the car containing structure, a movable stop on the approach track, means on the car containing structure for setting the stop, said means including a rotatable member having arms adapted to be engaged by parts on passing cars to cause rotation of the rotatable member, and means for retarding the rotation of said rotatable member.

7. In a device of the character described, a car containing structure, an approach track leading to the car containing structure, a movable stop on the approach track, means operated by movement of the car containing structure for opening the stop on the approach track, and means on the car containing structure for setting the stop, said means adapted to be operated by successive engagement of a predetermined number of parts on passing cars.

8. In a device of the character described, a car containing structure, an approach track leading to the car containing structure, a movable stop on the approach track, means operated by movement of the car containing structure for opening the stop on the approach track, and means on the car containing structure for setting the stop, said means including a rotatable member adapted to be operated by successive engagement of a predetermined number of parts on passing cars.

9. In a device of the character described, a car containing structure, an approach track leading to the car containing structure, a movable stop on the approach track, means operated by movement of the car containing structure for opening the stop on the approach track, and means on the car containing structure for setting the stop, said means including a rotatable member having arms adapted to be engaged by parts on passing cars to cause rotation of said rotatable member.

10. In a device of the character described, a car containing structure, an approach track leading to the car containing structure, a movable stop on the approach track, means operated by movement of the car containing structure for opening the stop on the approach track, means on the car containing structure for setting the stop, said means adapted to be operated by successive engagement of a predetermined number of parts on passing cars, and means for retarding the movement of said stop setting means.

11. In a device of the character described, a car containing structure, an approach track leading to the car containing structure, a movable stop on the approach track, means operated by movement of the car containing structure for opening the stop on the approach track, means on the car containing structure for setting the stop, said means including a rotatable member adapted to be operated by successive engagement of a predetermined number of parts on passing cars, and means for retarding the movement of said stop setting means.

12. In a device of the character described, a car containing structure, an approach track leading to the car containing structure, a movable stop on the approach track, means operated by movement of the car containing structure for opening the stop on the approach track, means on the car containing structure for setting the stop, said means including a rotatable member having arms adapted to be engaged by parts on passing cars to cause rotation of said rotatable member, and means for retarding the movement of said stop setting means.

Witness our hands and seals this 20 day of June, 1923.

GEORGE N. SIMPSON [L. S.]
ARTHUR M. SIMPSON [L. S.]